United States Patent Office 2,743,014
Patented Apr. 24, 1956

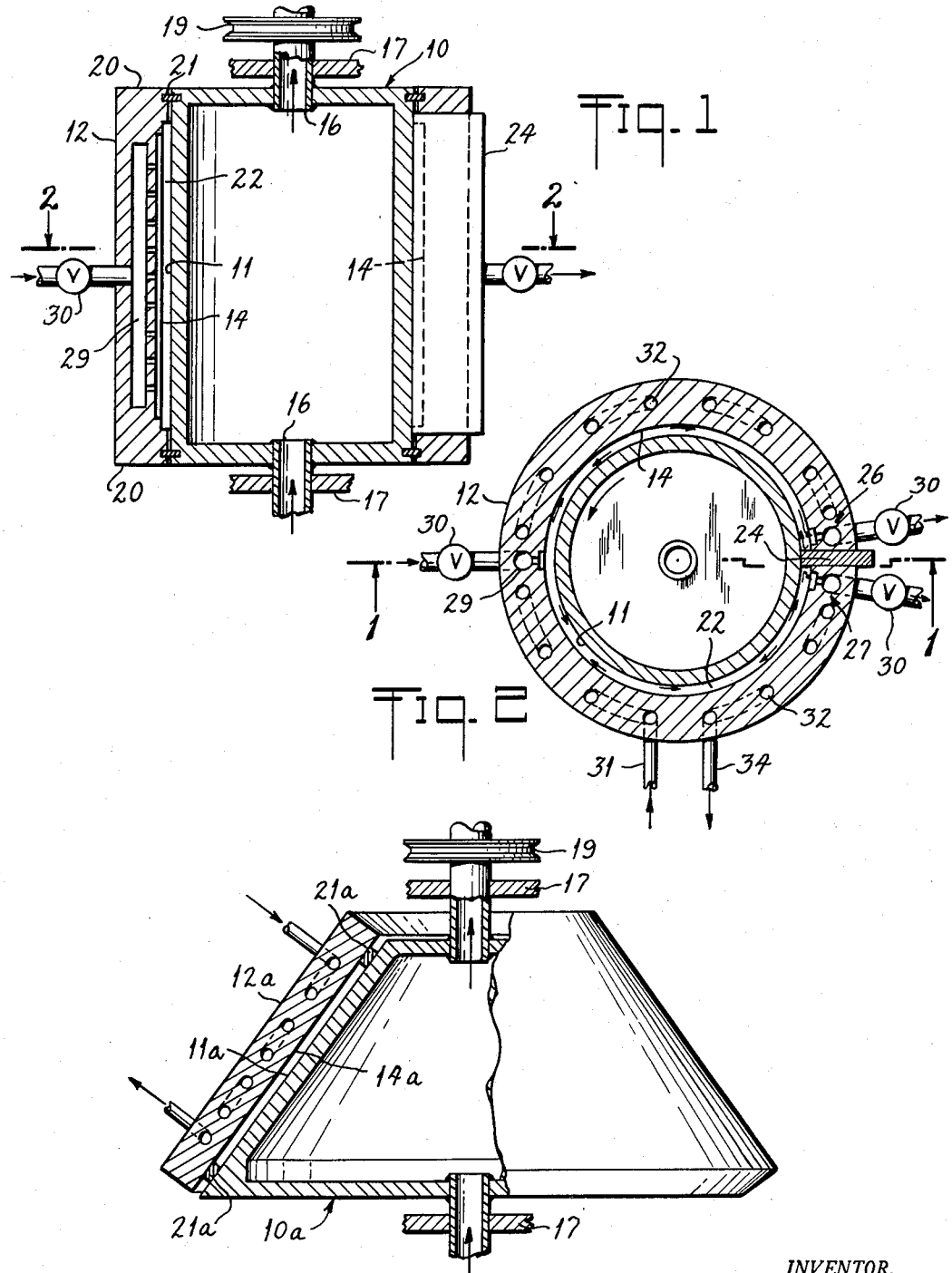

2,743,014

METHOD AND APPARATUS FOR SEPARATING FLUIDS BY THERMAL DIFFUSION

David Frazier, Cleveland Heights, Ohio, assignor to The Standard Oil Company, Cleveland, Ohio, a corporation of Ohio Application October 21, 1952, Serial No. 316,029

8 Claims. (Cl. 210—52.5)

This invention relates to improvements in apparatus and continuous methods for separating fluid mixtures by thermal diffusion.

It has been known for some time that the imposition of a temperature gradient across a fluid mixture, a term intended herein to include mixtures of gases, mixtures of miscible liquids, liquids containing one or more materials in solution, and the like, creates thermal diffusive forces tending to separate the mixture into two or more fractions containing components of the mixture in concentrations that differ appreciably from the concentrations thereof in the initial mixture. Advantage may be taken of this phenomenon by confining a fluid mixture in a narrow separation chamber or slit defined by opposed and closely spaced walls of thermally conductive, impervious and inert material and maintaining one of the walls at a temperature appreciably higher than the other. A fluid mixture so confined tends to separate into at least two fractions, one of which accumulates adjacent the face of the hotter wall and is enriched in one of the components of the mixture, and another of which accumulates adjacent the face of the cooler wall and is impoverished in said component or enriched in another component.

Suggestions have been made in the art to separate fluid mixtures by thermal diffusion in a continuous manner. Generally this involves introducng a stream of the fluid mixture into a separation chamber defined by stationary and closely spaced walls maintained at different temperatures and continuously withdrawing a first fraction from adjacent the face of the hotter wall of the chamber and a second fraction from adjacent the face of the cooler wall of the chamber. Such continuous methods are conveniently classified into concurrent flow and countercurrent flow methods. In concurrent flow methods the fluid mixture is introduced into the separation chamber at one end and the fractions separated by thermal diffusion are both withdrawn from the chamber at the other end. In countercurrent flow methods the fluid mixture may be introduced into the separation chamber at any convenient point, e. g., at one end or at any point intermediate the ends, and the separated fractions are withdrawn at opposite ends. Thus, for example, it is possible to introduce the mixture into the separation chamber midway between the ends and to withdraw the separated fractions at the opposite ends. It is also possible to introduce the mixture at one end of the separation chamber, to remove one fraction at the same end and another fraction at the opposite end.

In the countercurrent thermal diffusion methods heretofore proposed, it has been considered necessary to limit the rate of throughput to a rate that will not exceed the rate of thermal circulation within the separation chamber which is due to the convective effect produced by the relative heating of the material adjacent the face of the hotter wall and the relative cooling of material adjacent the face of the cooler wall. In order to minimize as far as possible the limitation on the rate of throughput imposed by the rate of thermal circulation in countercurrent flow methods, it has generally been found desirable to place the separation chamber in a vertical position and to make the walls defining the chamber as long, i. e., as high, as practicable to the end that the rate of thermal circulation will be correspondingly increased. This has created considerable practical difficulties, since it is expensive to manufacture large surfaces, cylindrical or flat, within such close tolerances that they will form, when placed closely adjacent one another, a separation chamber having a substantially uniform slit width. Further difficulties are encountered due to expansion and contraction problems when the opposed slit-forming walls are relatively heated and cooled.

The basic fundamentals of separation by thermal diffusion apply to both liquid and gaseous mixtures. It has been observed that in gaseous thermal diffusion, a fraction enriched in the lighter component or components of the mixture apparently always accumulates adjacent the hotter of the two confining wall faces. In liquid thermal diffusion which requires the two confining wall faces to be appreciably closer together, i. e., spaced apart of the order of about 0.15 inch or less, a fraction enriched in the lighter component or components likewise usually accumulates adjacent the hotter of the two walls but sometimes as, for example, in the separation of hexadecane and isopropyl benzene, the fraction enriched in the lighter components accumulates adjacent the cooler of the two walls.

It has been proposed to carry out countercurrent flow methods of thermal diffusion in a horizontal separation chamber wherein the hotter wall is disposed above the relatively cooler wall. Countercurrent flow is induced by providing rectilinearly and oppositely moving, thermally conductive tapes, the suggestion being that the tape moving toward one end of the column adjacent the upper hot wall will draw, by viscous drag, the material accumulating adjacent the hotter wall to one end of the chamber while the other tape will draw, likewise by viscous drag, the material accumulated adjacent the cooler wall to the opposite end of the column. This proposal, however, is believed to be impracticable because of the extremely close spacing required between the opposed walls in a thermal diffusion column and the inherently poor thermal conductivity between a stationary wall and a moving tape, particularly when there is a film of liquid or gas between the stationary and the moving surfaces thereof.

Generally, the method of the invention comprises introducing a fluid mixture under pressure into a separation zone formed by two thermally conductive, inert and impervious wall members having smooth, opposed and closely spaced faces defined by surfaces of revolution about a single reference axis. One of the wall members is maintained at a higher temperature than the other wall member and one of the wall members is rotated on the reference axis at a peripheral speed sufficient to avoid substantial thermal circulation of the confined fluid mixture and separated fractions thereof, but insufficient to create any substantial turbulence in the confined fluid. The fractions accumulated adjacent the faces of the respective wall members are withdrawn by suitable means preferably provided in the stationary wall member.

The apparatus of the present invention generally comprises an inner wall member of inert, thermally conductive material having a smooth outer face defined by a surface of revolution about a reference axis, and an outer wall member likewise of inert, thermally conductive material, having a smooth inner face defined by a second surface of revolution about the same reference axis. The inner and outer faces of the outer and inner wall members, respectively, are opposite one another and substantially equidistantly and closely spaced to define a separation chamber for the fluid mixture. A barrier member, defining opposite ends of the chamber, is provided in one of the wall members and extends to the face of the other wall member. The barrier member is preferably in a plane of the reference axis. One of the wall members, preferably the inner wall member, is provided with means for rotating it on the reference axis relative to the other wall member, which is preferably maintained stationary and provided with an inlet port and at least two outlet ports. The outlet ports are preferably parallel to and adjacent the barrier member and on opposite sides thereof. The inlet port may be in any desired position on the periphery of the outer wall member intermediate the ends of the separation chamber as they are defined by the barrier member. In some applications, particularly where it is desired to withdraw the material accumulating adjacent one wall at a much lower rate than it is desired to withdraw the material accumulating adjacent the other wall, it may be advantageous to locate the inlet port fairly close to one of the outlet ports. Means are provided to relatively heat and cool the opposed wall members so that a temperature gradient will be created and maintained across the space or slit between the wall surfaces forming the separation chamber.

A surface of revolution is by definition a surface generated by revolving a plane curve about a line, i. e., a reference axis, lying in its plane. This term, therefore, includes the surfaces of cylinders, cones and the like.

One of the primary advantages of the apparatus and method of this invention is that the speed of separation to fluid mixtures by thermal diffusion which involves countercurrent flow is not limited by the rate of thermal circulation. In fact, the method is most advantageously carried out at feed rates considerably in excess of the rate of thermal circulation.

Another important advantage, particularly of the apparatus of the invention, is that the fraction accumulating adjacent one surface or the other of the separation chamber is forced toward a withdrawal port designed to remove that particular fraction from the chamber by a moving surface which is, itself, heated or cooled, as the case may be, and whose temperature does not depend upon transfer of heat between a stationary and a moving surface separated by a film of liquid or gas.

These and further advantages, as well as the utility of the invention, will become more apparent from the following detailed description made with reference to the accompanying drawing, wherein:

Figure 1 is a cross-sectional view in elevation through one form of apparatus embodying the invention;

Figure 2 is a plan view, also in section, taken along section line 2—2 of Figure 1; and Figure 3 is a view in elevation, partially in section, of another embodiment of the apparatus of the invention.

Referring now particularly to Figures 1 and 2 of the drawing, there is illustrated a rotatable drum 10 having a smooth outer cylindrical face 11 and an outer wall member 12 having an inner face 14 that is likewise cylindrical. The drum 10 is mounted on a hollow shaft 16 rotatable in bearings 17 and rotated by suitable means such as a pulley 19, as indicated schematically in Figure 1. The outer wall member 12 is provided with a flange 20 at each end acting as a bearing for the drum 10. If desired, one or more rings 21, e. g., piston rings, may be provided between the inner surfaces of the flanges 20 and the outer face of the drum 10 at the ends thereof to more effectively seal the separation chamber 22 formed between the outer face 11 of the drum 10 and the inner face 14 of the outer wall member 12.

A barrier member 24 is provided in the outer wall member 12 to protrude into the separation chamber 22 and define the ends thereof. This barrier member 24 preferably lies in the plane of the axis of rotation of the drum 10 and its inner end is in sliding contact with the outer face 11 of the drum 10. The outer wall member 12 is further provided with two withdrawal ports shown schematically at 26 and 27. These withdrawal ports, which are preferably substantially parallel to and adjacent opposite sides of the barrier member 24, essentially are constructed to withdraw fluid at a substantially uniform rate throughout their length, i. e., along the entire breadth of the separation chamber 22, and may, for example, be of the groove type described in application Serial No. 273,379, the knife edge type described in application Serial No. 273,737, or the porous plate type described in application Serial No. 273,738, all filed February 27, 1952.

An inlet port 29 is provided in the outer wall member 12 at one or more locations around the circumference of the outer wall member. This port may be constructed in the same manner as outlet ports 26 and 27 and is designed to introduce, substantially uniformly over the breadth of the separation chamber 22, the fluid mixture to be separated into two or more fractions. Valves 30 are provided at the inlet and withdrawal ports to regulate the speed of flow and pressure of the fluid introduced into the chamber 22 and the ratio of withdrawal rates by way of ports 26 and 27.

The inner face 14 of the outer wall member 12 may be heated or cooled, as the case may be, by a heating or cooling medium introduced at 31, circulated through coils shown schematically at 32, and withdrawn at 34. Likewise, a cooling or heating medium may be introduced through the hollow shaft into one end of the drum 10 and withdrawn from the hollow shaft 16 at the other end to cool or heat the outer face 11 thereof. It is to be understood, of course, that any well known heating and cooling means can be employed. Thus, for example, the coils 32 in the outer wall member 12 can be replaced by electrical heating means.

In operation, the fluid to be subjected to thermal diffusion is introduced by way of inlet port 29 into the separating chamber 22, the drum 10 being rotated at a peripheral speed sufficient to overcome thermal circulation but insufficient to create turbulence within the separating chamber. The fraction of the fluid mixture that accumulates adjacent the outer face 11 of the drum member 10 by virtue of a temperature gradient across the separation chamber 22 between the faces 11 and 14 is impelled, by surface friction, in a counterclockwise direction, as shown by the arrows in Figure 2, toward the barrier member 24 and thence to the withdrawal port 27. The fraction accumulating adjacent the stationary inner face 14 of the outer wall member 12 moves along the face 14 in a generally clockwise direction, as seen in Figure 2, toward the barrier member 24 and is withdrawn through withdrawal port 26. The valves 30 of the withdrawal ports 26 and 27 are adjusted suitably to withdraw the respective fractions at a pre-selected ratio of rates.

Referring now to the embodiment illustrated schematically in Figure 3, it will be noted that the principle is essentially the same as that of the embodiment illustrated in Figures 1 and 2. The drum member 10a, however, is in the form of a truncated cone and the outer wall member 12a is correspondingly shaped. This embodiment is advantageous because it is possible to fit the drum member 10a into the outer wall member 12a with greater accuracy than is conveniently possible in the embodiment shown in Figures 1 and 2. In addition, the rings 21a, which serves the triple functions of spacers, gaskets and bearing materials between the opposed conical surfaces, may be replaced with thicker or thinner rings to increase or decrease, respectively, the spacing between the inner face 14a of the outer wall member 12a and the outer face 11a of the drum member 10a.

It is to be understood, of course, that inasmuch as the method of the invention makes possible separation of different fractions of a fluid mixture at rates in excess of the rate of thermal circulation, there is no limitation to the position of the axis of the apparatus. Thus the axes of the apparatus shown by way of example in the drawing may be horizontal, vertical or inclined. Furthermore, it is to be understood that the speed of rotation, preferably of the inner member, will depend, to a considerable extent, upon the nature of the fluid mixture being subjected to thermal diffusion, and particularly upon its tendency to flow turbulently. For the separation of liquid mixtures, a peripheral speed of approximately one foot per second is indicated. In order that the fraction adjacent the stationary wall may flow in a direction counter to the direction of rotation of the rotating member, it is, of course, necessary that the rate of feed must exceed the rate at which the fraction accumulating adjacent the rotating wall is advanced toward one end of the separation chamber.

Innumerable variations and modifications of the method and apparatus disclosed herein will immediately become apparent to those skilled in the art. All such variations and modifications are intended to be included within the scope of the invention as defined in the appended claims.

I claim:

1. Apparatus for separating fluid mixtures into dissimilar fractions by thermal diffusion which comprises an inner wall member of inert, thermally conductive material having a smooth outer face defined by a first surface of revolution about a reference axis; an outer wall member of inert, thermally conductive material having a smooth inner face defined by a second surface of revolution about said reference axis; said inner and outer faces of the outer and inner wall members, respectively, being opposite one another and substantially equidistantly and closely spaced to define a separation chamber for the fluid; a barrier member defining the opposite ends of the chamber, said barrier member protruding from one of said inner and outer wall members to the face of the other wall member; an inlet communicating with the chamber; first and second outlets communicating with the chamber at opposite ends thereof; means to maintain one of the wall members at a higher temperature than the other; and means for rotating one of the inner and outer wall members on said reference axis and relative to the other wall member to conduct the fractions of the mixture accumulating adjacent the outer and inner surfaces, respectively, countercurrent to each other to said outlets.

2. Apparatus as defined in claim 1 wherein the outer and inner faces of the inner and outer wall members, respectively, are cylindrical.

3. Apparatus as defined in claim 1 wherein the first and second surfaces of revolution defining the outer and inner faces of the inner and outer wall members, respectively, are truncated cones.

4. Apparatus as defined in claim 1 wherein the barrier member protrudes from the outer wall member to the outer face of the inner wall member and the inlet and outlets are in the outer wall member.

5. Apparatus as defined in claim 1 wherein the inner wall member is rotatable on the reference axis and the outer wall member is stationary.

6. A method for separating fluid mixtures into dissimilar fractions by thermal diffusion, which comprises introducing a fluid mixture under pressure into a separation zone; confining said introduced fluid mixture between two smooth, opposed, closely spaced and thermally conductive walls defined by surfaces of revolution about a single reference axis; maintaining one of said walls at a higher temperature than the other of said walls to separate the mixture into at least two dissimilar fractions and accumulate them adjacent the faces of the opposed walls; rotating one of the walls on the reference axis at a peripheral speed sufficient to avoid substantial thermal circulation of the confined fluid mixture and insufficient to create substantial turbulence in the confined mixture; and separately withdrawing the fractions of the fluid mixture accumulated adjacent the respective walls.

7. A method for separating fluid mixtures into dissimilar fractions by thermal diffusion, which comprises introducing a fluid mixture under pressure into a separation zone; confining said introduced fluid mixture between two smooth, opposed, closely spaced and thermally conductive walls defined by surfaces of revolution about a single reference axis; maintaining one of said walls at a higher temperature than the other of said walls to separate the mixture into at least two dissimilar fractions and accumulate them adjacent the faces of the opposed walls, one of the walls being rotated on the reference axis at a peripheral speed sufficient to avoid substantial thermal circulation of the confined fluid mixture and insufficient to create substantial turbulence in the confined mixture; and separately withdrawing the fractions of the fluid mixture accumulated adjacent the respective walls.

8. A method for separating liquid mixtures into dissimilar fractions by thermal diffusion, which comprises introducing a liquid mixture into a separation zone between two smooth, opposed, closely spaced and thermally conductive walls defined by surfaces of revolution about a single reference axis; maintaining one of said walls at a higher temperature than the other of said walls to separate the mixture into at least two dissimilar fractions, one adjacent the face of each of the opposed walls; rotating one of the walls on the reference axis at a peripheral speed insufficient to create substantial turbulence in the confined mixture; and separately withdrawing the fractions of the liquid mixture accumulated adjacent the respective walls.

References Cited in the file of this patent

UNITED STATES PATENTS

| | | |
|---|---|---|
| 1,664,769 | Chance | Apr. 3, 1928 |
| 1,747,155 | Birdsall | Feb. 18, 1930 |
| 1,900,394 | Cottrell | Mar. 7, 1933 |
| 1,998,359 | Cowan | Apr. 16, 1935 |
| 2,390,115 | McNitt | Dec. 4, 1945 |
| 2,521,112 | Beams | Sept. 5, 1950 |
| 2,541,071 | Jones et al. | Feb. 13, 1951 |